United States Patent Office 3,305,768
Patented Feb. 21, 1967

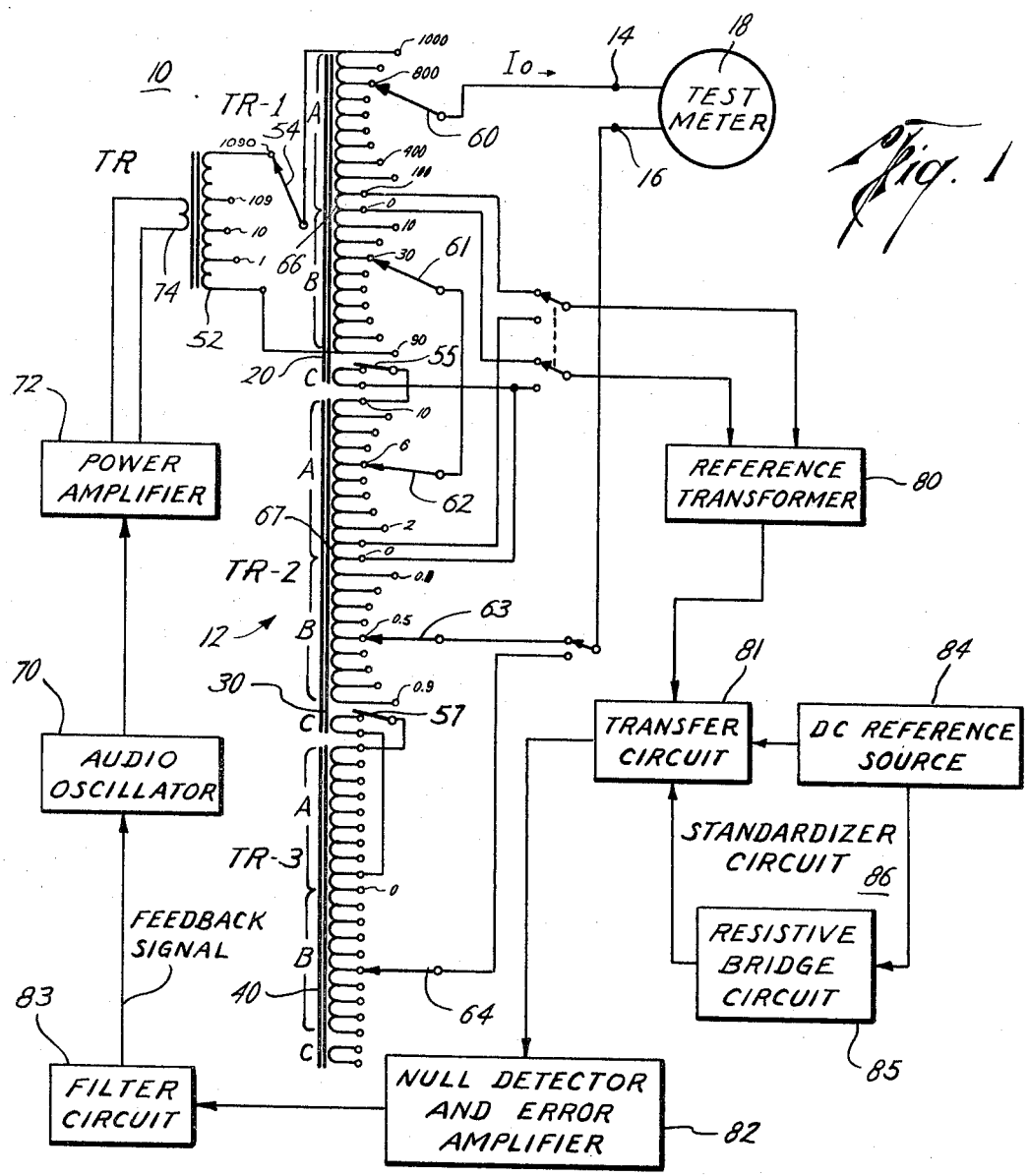
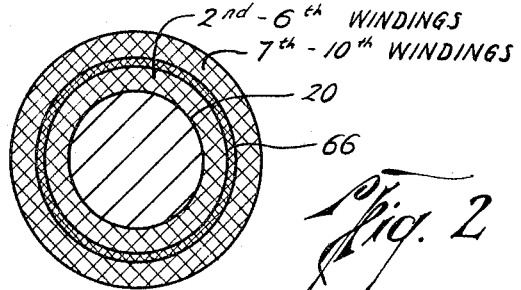

3,305,768
A.-C. VOLTAGE CALIBRATING APPARATUS
Kenneth J. Koep, South Plainfield, N.J., assignor to Weston Instruments, Inc., a corporation of Delaware
Filed Feb. 14, 1963, Ser. No. 258,580
4 Claims. (Cl. 323—43.5)

This invention relates to an A.-C. voltage calibrator and more particularly to an A.-C. voltage calibrating apparatus which includes a feed-back arrangement for accurately controlling and regulating the calibrator's output voltage to a utilization device as to an instrument for calibration.

Often it is necessary to provide to a utilization device a regulated A.-C. voltage in the audio frequency range— say, between 50 c.p.s. to 10 kc. or higher; the amplitude of the output voltage should remain constant with load variations within prescribed limits. For example, it is often necessary to check the indicating accuracy of A.-C. voltmeters or originally to calibrate their scale.

Various calibrating devices are known in the art. Most such devices comprise, for example, a manually controlled A.-C. voltage source feeding a potential divider of which the output voltage is measured by an A.-C. instrument of high precision. In a typical calibrating procedure, it is customary to mark the pointer for five-to-fifteen standardized values of voltage applied to the instrument being calibrated, the values being judiciously selected to cover the entire range of the instrument's scale. The scale itself is then drawn either by hand or by a dividing machine; the intermediate scale divisions are then interpolated by eye or mechanically.

The use of such prior art calibrating devices, however, necessitated accurate adjustments of circuit control elements to obtain each standardized output voltage. For high precision calibration, the collaboration of two operators was necessary, one operator making suitable circuit adjustments to observe on the scale of the standard indicating instrument the desired calibrating voltage and then ordering the second operator to calibrate the test instrument. Obviously such prior art calibrating procedure is wasteful of both time and money: it requires many hours of labor to calibrate only a relatively small number of test instruments.

Accordingly, it is a main object of this invention to provide a new and improved calibrating apparatus which is capable to calibrate a relatively large number of test instruments in a relatively short period of time thereby reducing the cost of calibration to a minimum.

Another object of this invention is to provide a new and improved apparatus for use in the calibration of A.-C. instruments which includes a novel voltage divider from which discrete output voltages are obtainable merely by actuating a few switches or calibrated dials, rather than by controlling various circuit elements and by observing the scales of high precision instruments.

A further object of this invention is to provide a new and improved A.-C. instrument calibrator for the calibration of indicating instruments which includes a feed-back arrangement for assuring accurate output voltage values throughout the calibrator's entire range of output values.

A still further object of this invention is to provide a new and improved apparatus for use in calibration of A.-C. instruments including a novel voltage divider in which each winding has the same ratio of internal impedance to induced voltage as every other winding.

The apparatus of this invention includes a variable frequency audio-voltage supply coupled to a novel voltage divider capable of subdividing each of the calibrator's full-range scales (typically there are a plurality of ranges) into several thousand equal parts; the voltage divider comprises one or more auto-transformers, each preferably having a high permeability magnetic core on which are wound several series-connected windings, arranged in decades, and at least one energization winding. The A.-C. voltage supply is coupled to the first auto-transformer; the energization winding of the first auto-transformer is coupled to the second auto-transformer; the energization winding of the second auto-transformer is coupled to the third auto-transformer, etc. The impedance of each winding is selected to assure a uniform ratio of internal impedance to induced voltage, i.e., the same ohms-per-volt ratio. To regulate the calibrator's output voltage with load variations, frequency variations, etc., the output voltage of a reference winding in the most significant decade is compared in a standardizer circuit which yields an error, feed-back signal for adjusting the output of the A.-C. voltage supply by an amount and in a direction as to maintain the output voltage from the calibrator within the allowed tolerances.

The above and other objects and advantages of this invention will become apparent from the following description when taken in conjunction with the accompanying drawings. It will be understood that the drawings are for purposes of illustration only and are not to be construed as defining the scope or limits of the invention, reference being had for the latter purpose to the appended claims. In the drawing:

FIG. 1 is a schematic diagram of a precision A.-C. calibrator employing the novel voltage divider of this invention; and FIG. 2 is a view, partly in cross section, of a typical auto-transformer in FIG. 1 illustrating the manner of interleaving the windings.

In FIG. 1 is shown a voltage calibrating system, generally designated as 10, including a voltage divider 12 from which an output, standardized voltage across output terminals 14, 16 is automatically obtained by the mere actuation of a few switches or dials. The output voltage may vary with variations in the output current $I_o$ supplied to a utilization device, as to a test meter 18 whose scale it is desired to calibrate. The output voltage may also vary with changes in frequency, in the physical environmental operating conditions such as temperature, shock, vibration, etc. Because of its unique construction, voltage divider 12 can provide to load 18 a substantially distortionless sine wave having a harmonic distortion of, say, less than .25% at the lower audio-frequency range and less than .5% at the higher audio-frequency range. The most distinctive feature of divider 12, however, is that it can calibrate instruments of vastly different loads requiring output currents $I_o$—say, between 40 milliamps to 5 amperes or higher.

The voltage divider 12 may include one or more auto-transformers, depending on the desired number of ranges and the number of parts into which each range is to be subdivided. For simplicity of the drawing, only three auto-transformers TR-1, TR-2, and TR-3, respectively associated with cores 20, 30, and 40, are shown. Preferably, each core is made of high quality, grain-oriented, silicon steel (such as made, for example, by Westinghouse Mod. RL-459T). Such cores operate at relatively high flux densities thereby necessitating of each winding less turns per volt output and, hence, a minimum resistance IR drop. Each core should preferably be gapless or re-entrant. A toroidal configuration of either rectangular or circular cross section is well suited.

Depending on the fineness and linearity of voltage division desired, a number of groups of windings are wound on each core. Illustratively, only three groups of windings A, B, and C are shown per core. Each of groups A and B includes ten series-connected windings to form a decade. Decades A and B are connected in series. Group C, which may consist of a single winding, is used to energize the next auto-transformer; i.e., the output voltage from winding C on TR–1 is coupled to energize TR–2; the output voltage from winding C on TR–2 is coupled to energize TR–3, etc., as shown on the drawing. To maintain within each winding the same ratio of impedance to induced voltage (ohms-per-volt), the diameter of the wires used to form the windings on the auto-transformers may be varied. For example, to achieve the same ratio of ohms-per-volt in each winding of each decade and to maintain the required scaling factor between the decades (in the illustrated drawing the scaling factor is a multiple of ten), decade A of TR–1 may be formed of 100-ohm windings, decade B of TR–1 of 10-ohm windings, decade A of TR–2 of one-ohm windings, and decade B of TR–2 of one-tenth-ohm windings, etc.

To minimize the leakage reactance and to achieve a good linearity of voltage division, the windings are interleaved on each core and symmetrically wound about the core's center. For example, the manner of interleaving and grouping the windings of decade A on the core 20 is illustrated in FIG. 2 where the 2nd–6th windings (counting from the bottom or "reference" winding) are first wound, then the "reference" winding, and then the 7th–10th windings. Although theoretically at least all the windings could be wound on a single core, in practice it is desirable to employ more than one core because it is then possible to vary the number of turns-per-volt. For example, each 100-volt winding on TR–1 may consist of 220 turns, each 10-volt winding on TR–1 of 22 turns, and the excitation winding C on TR–1 of 22 turns. On the other hand, each 1-volt winding on TR–2 may consist of 30 turns and each .1-volt winding on TR–2 of 3 turns. Thus, the number of turns-per-volt can vary between the auto-transformers.

The further description and operation of the voltage divider 12 will be best understood by reference to a typical set of operating parameters illustrated on the drawing. The secondary winding 52 of a matching transformer TR provides to divider 12 four voltage ranges of 1, 10, 109, and 1090 volts. For the maximum output voltage range, the 1090-volt output tap is connected through a stepping switch 54 to the upper winding of decade A on core 20. Because the excitation winding C of TR–1 has the same number of turns as each winding of decade B on TR–1, ten volts are induced in winding C. The output voltage of winding C is connected through switch 55 across the terminals of decade A on core 30. With the connections as shown, the voltage range of 1090 volts may be subdivided into .1-volt incremental steps. Should a finer subdivision be desired, then the two decades A, B on TR–3 can be added.

To achieve one-tenth of the above-described voltage range, the 109-volt output tap of TR is connected to the upper winding of decade A of TR–1. For a more reduced range, the 10-volt tap of TR is connected to the output winding of decade A on TR–2 (in a manner similar to the connection of the 109-volt tap to TR–1). Each winding in decade A on TR–2 then has one volt across its terminals and each winding in decade B on TR–2 has one-tenth of a volt across its terminals. In the latter case the energizing winding C on TR–2, which also has one-tenth volt induced therein, is connected through switch 57 to decade A on TR–3 and, consequently, each winding of decade A on TR–3 has .01 volt thereacross and each winding of decade B on TR–3 .001 volt thereacross. Finally for the last range, the 1-volt tap on TR is connected across decade A on TR–2 and the energizing winding C on TR–2 again is connected to decade A on TR–3.

The magnitude of the output voltage across terminals 14, 16 depends on the relative positions of divide switches or dials 60–64. For the dials' positions as shown, the total output to the test meter 18 is 836.5 volts.

Because the voltage dividing auto-transformers, designed as above-described, are extremely linear dividers over their operating current and frequency ranges, it is possible to use the percent variation of the voltage on the lowest winding ("reference" winding) of the most significant decade as representative of the percent variation of the total output voltage at terminals 14, 16. The reference winding for the 1090- and the 109-volt ranges is the bottom-tapped winding 66 of decade A on TR–1. The reference winding for the 10- and 1-volt ranges is the first winding 67 of decade A on TR–2.

The standardization of the output voltage of the reference winding may be achieved by providing a variable output signal generator or audio oscillator 70 coupled to a power amplifier 72 feeding the primary winding 74 of the matching transformer TR. To compensate for the calibrator's output voltage fluctuations, a dynamic feed-back loop is provided. The feed-back loop includes a reference transformer 80, a transfer circuit 81, a null detector and error amplifier 82, and a filter circuit 83—all connected as shown. Also coupled to the transfer circuit 81 is a D.-C. reference source 84 and a resistive bridge circuit 85. Networks 81, 84, and 85 form a standardizer circuit, generally designated as 86.

In a typical operation of the feed-back arrangement, a stable noise-free D.-C. signal is provided by the D.-C. reference soorce 84 and is used as the standard of the system. An A.-C. signal proportional to the output reference voltage of either winding 66 or 67 is supplied by the reference transformer 80. The function of the reference transformer 80 is to provide a suitable voltage value to the transfer circuit 81. The transfer circuit 81 and the resistive bridge circuit 85 compare the D.-C. reference signal provided by the reference source 84 with a signal proportional to the A.-C. output from the reference transformer 80. If the two signals are equal to within a preselected reference value, then an error signal below a predetermined level is supplied to the null detector and error amplifier 82. On the other hand, if the difference between the two signals supplied to the transfer circuit 81 exceeds said predetermined level, then a corresponding error signal is supplied to the null detector 82. The amplified error signal, after being filtered by the filter circuit 83, is applied to a control terminal within the oscillator 70 for adjusting its output voltage level by an amount corresponding to the error signal. The oscillator's output is amplified by power amplifier 72, which for the illustrated values may have a power rating of 120 watts at 120 volts over the frequency range of 50 c.p.s. to 10 kc. The power output of the power amplifier 72 feeds the transformer TR.

The manner in which the feed-back loop operates to assure a constant output voltage with load or other variations will now be explained with reference to the numbers used. Assume that the impedance of the reference 100-volt winding 66 is ten ohms. Then the impedance of each 10-volt winding would be 1 ohm, of the 1-volt winding .1 ohm, and of the .1-volt winding .01 ohm. Assume further that the output current $I_o$ is 40 milliamps. Because the output current flows through the reference winding 66, as well as through the other windings, the voltage across the reference winding will drop by .4 volt or by .4%. The change in the level of the reference voltage will be sensed by the transfer circuit 81 which will provide an error signal to the detector 82. The error signal will cause the output voltage from oscillator 70 and, hence, from the power amplifier 72, to rise by .4%. The rise in the excitation voltage of TR will re-establish the voltage in the reference winding to its normal value of 100 volts. The .4% increase in excitation voltage compensates for the .4% IR drop in each winding of decade A on TR–1. Inasmuch as the 40-milliamps load current also flows through the 10-volt windings of decade B on TR–1, each winding experiences an IR drop of .04 volt (1 ohm×.04 amp). This amounts to a .04-volt drop in a 10-volt level or, again, a .4% change. Since the excitation voltage was increased by .4%, the internal IR drop in each of the windings of decade B on TR–1 is also compensated. The .4% increase in excitation voltage equally applies to the excitation winding C on TR–1. Hence, the voltage level in each of the windings in decades A and B on TR–2 also rises by .4% which results in a complete compensation for the IR drops in each of the windings of TR–2. Consequently, by maintaining the same ratio of resistance to voltage (ohms-per-volt) in each winding of each decade, it is possible to obtain through the feed-back loop a constant output voltage for all external load conditions within the burden limitations and for frequency and other variations.

Although for the purpose of explaining the invention a particular embodiment thereof has been shown and described, obvious modifications will occur to a person skilled in the art, and I do not desire to be limited to the exact details shown and described.

What is claimed is:

1. An A.-C. voltage calibrator comprising a variable source of A.-C. current; at least one transformer inductively coupled to receive current from said source and thereby generating an excitation voltage which varies in amplitude proportionally to variations in amplitude of the A.-C. current from said source, said transformer including at least one group of plural discrete windings having end terminals series-connected at least one of said windings being a reference winding and producing thereacross a reference voltage, each discrete winding having the same ratio of impedance to induced voltage as every other discrete winding so that any voltage drop across the end terminals of each winding is a constant percentile of the amplitude of the excitation voltage that is induced in each winding, a device under voltage calibration connected to two selected end terminals including therebetween at least said reference winding, a standardization circuit connected to receive as an input the reference voltage from said reference winding and including a standard voltage source for providing a standard voltage, said standardization circuit comparing the reference voltage to the standard voltage and producing an error signal representing by magnitude and sense the difference between the voltages, and means coupling said source of A.-C. current to said standardization circuit responsive to an error signal from said standardization circuit for adjusting the amplitude of the A.-C. current so that an excitation voltage is induced in each winding having a magnitude and sense such as to compensate for any percentile voltage drop produced across at least said reference winding, whereby a constant calibrating voltage is impressed on said device.

2. The calibrator, as claimed in claim 1, wherein said transformer includes a plurality of groups of series-connected windings, the number of turns of the individual windings of one group differing by a common factor from the number of turns of the windings comprising another group, but the windings of the groups having the same ratio of impedance to induced voltage so that substantially the same percentile voltage drop appears across each winding.

3. A voltage calibrator comprising at least a first and a second transformer, said first transformer comprising series-connected windings grouped to form a first and a second decade, an energization winding electrically isolated from said series-connected windings, said second transformer comprising series-connected windings grouped to form at least a third decade, means coupling said energization winding to energize said first and second transformers, a pair of output terminals, switching means coupling discrete windings on said first and second transformers to said output terminals, said windings of said first and said second transformers each having substantially the same ratio of internal impedance to induced voltage, an adjustable alternating-current source, means coupling said current source to energize said energization winding, a standardization circuit including a direct-current reference source for comparing the output voltage of a winding in said first decade with said reference source and for providing an error signal representing by magnitude and sense the difference therebetween, and means feeding back said error signal to said current source whereby the voltage across said output terminals is maintained substantially constant for each position of said switching means.

4. The calibrator of claim 3 wherein said first transformer includes a high permeability magnetic core and said first and said second decade windings are interleaved on said core thereby reducing the leakage inductance.

References Cited by the Examiner

UNITED STATES PATENTS

| | | | |
|---|---|---|---|
| 2,971,173 | 2/1961 | Kajihara | 336—183 X |
| 3,099,010 | 7/1963 | Taylor | 336—183 X |
| 3,113,261 | 12/1963 | Morgan | 323—43.5 |
| 3,162,799 | 12/1964 | Roberts | 323—43.5 |
| 3,179,875 | 4/1965 | Keats | 323—43.5 |
| 3,244,966 | 4/1966 | Gertsch | 323—435 |

JOHN F. COUCH, *Primary Examiner.*

LLOYD McCOLLUM, *Examiner.*

W. E. RAY, A. D. PELLINEN, *Assistant Examiners.*